United States Patent [19]

Long

[11] Patent Number: 5,485,157
[45] Date of Patent: Jan. 16, 1996

[54] DOPPLER RADAR DETECTION SYSTEM

[76] Inventor: Maurice W. Long, 1036 Somerset Dr., NW., Atlanta, Ga. 30327

[21] Appl. No.: 320,695

[22] Filed: Oct. 11, 1994

[51] Int. Cl.[6] .................... G01S 13/534; G01S 7/28
[52] U.S. Cl. .................... 342/160; 342/93; 342/159
[58] Field of Search .................. 342/89, 90, 91, 342/93, 159, 160, 162

[56] References Cited

U.S. PATENT DOCUMENTS

| | | | |
|---|---|---|---|
| 3,829,858 | 8/1974 | Bergvist | 342/93 |
| 4,067,013 | 1/1978 | Smith | 342/91 |
| 4,459,592 | 7/1984 | Long | 342/93 |
| 4,684,950 | 8/1987 | Long | 342/94 |
| 4,809,002 | 2/1989 | Togashi et al. | 342/160 |

Primary Examiner—Ian J. Lobo

[57] ABSTRACT

The invention improves the radar detection capabilities for moving targets by censoring clutter and noise after it is outputted from a doppler processor. It effects the resulting clutter and noise suppression of doppler radars through use of thresholders that function in operative association, one principally for noise and the other principally for clutter.

16 Claims, 8 Drawing Sheets

DOPPLER RADAR DETECTION SYSTEM

BACKGROUND OF THE INVENTION

This invention relates to methods of and circuits for suppressing radar output due to clutter and noise while retaining desired output due to targets that are moving with velocities different than those of clutter. The invention is applicable to radars that operate on the doppler principle of detection and therefore it is applicable to cw doppler, pulse doppler and MTI (moving target indication) radars.

The principles of the three aforementioned types of radars are given in Chaps. 3 and 4 of the book *Introduction of Radar Systems*, McGraw-Hill Book Company, 1980, by M. I. Skolnik. Throughout this document the term "doppler radar" refers to either MTI, cw or pulse doppler radar.

This disclosure relates to the detection of moving targets with doppler radar for which the target echoes have relatively high doppler frequencies, and the rejection of land and sea clutter and noise. Radar clutter signals are unwanted signals caused by radar echo (see, e.g., Skolnik, p. 470), and clutter signal magnitude therefore depends on radar range and direction. Land and sea clutter, being from stationary and slowly moving objects, have relatively small doppler frequencies including frequencies at and near zero. Noise signals, on the other hand, are unwanted signals caused by random fluctuations having wide doppler frequency spectra extending from zero to an upper limit controlled by receiver bandwidth (Skolnik, pp. 23–29). Unlike clutter echo, noise at the radar output occurs at all radar ranges.

Based on the relative strengths of the doppler frequency components contained in the radar echo, doppler processors use filters to suppress signals from clutter and to retain signals from moving targets. These filters can be implemented in analog or digital hardware, or in software. Ideally the output of a doppler radar due to clutter is zero. However, a radar has frequency and amplitude instabilities that cause its doppler processed output to fluctuate, even though the echo is from a stationary object. Another cause for fluctuations in echo strength, which provides another source of non-zero doppler frequencies, is beam movement across a reflecting object due to antenna scanning. Therefore, radar output after doppler processing caused by stationary objects (clutter) is oftentimes much stronger than the output caused by some (the weaker) moving targets of interest.

The usual technique for rejecting clutter and noise is to employ an amplitude threshold level below which signals are rejected. Unfortunately, the threshold rejects the weaker targets and passes the stronger clutter and therefore amplitude thresholding is satisfactory only if, at the output of the doppler processor, the important target signals are stronger than most of the clutter and noise.

Modern automatic detection radars use a thresholding circuit called CFAR (constant false alarm ratio). The CFAR operates by adaptively following interference (whether from receiver or external noise or from clutter) and adjusting the threshold level so as to automatically reject the interference in each range cell (Skolnik, pp. 392–395). CFAR performance is effective against homogeneous clutter and noise. However, CFARs are inefficient suppressors of typical surface (ground and/or sea) clutter, which is not homogeneous and often consists of isolated and very strong clutter areas interspersed with regions of negligible clutter.

The most commonly used CFAR is called a range CFAR. A range CFAR sets its threshold in each range cell based on sampling, during each range sweep, the strengths of signals in its neighboring cells. Next, it combines and obtains a statistic (usually an average) of the sampled signals, and it sets a threshold for said each range cell, Then for each range cell, a radar signal is outputted if it exceeds its threshold. Thus, a detection is declared at a given range cell if it contains a signal that exceeds its threshold based on its aggregate of signals from nearby cells. Another well known type of CFAR is called a doppler CFAR. It samples doppler cells (filters), which are numerous in some pulse doppler radars (see, e.g., Patton and Ringel, U.S. Pat. No. 3,701,149). Then, based on a sampling of doppler cells, a threshold is set for each range cell.

Modern radars have a large number of range cells, and therefore CFAR processing is complex. In addition, a common weakness of CFARs is lack of robustness, i.e., inability to process effectively a wide variety of clutter types. Various trade-offs in CFAR designs can be made to accommodate problems of detection efficiency and false alarms that are created by both (1) a wide variety of clutter types and (2) the presence of multiple, closely spaced targets within nearby range cells (see, e.g., G. V. Morris, *Airborne Pulse Doppler Radar*, Artech House, 1988, Chapter 17). However, the changes in design required for solving these problems contribute to additional complexity; and thus contribute to further increases in size, weight and costs.

U.S. Pat. Nos. 4,459,592 and 4,684,950 teach ratio comparator methods and means for establishing an adaptive clutter threshold level to reject isolated clutter even though it is very strong. More specifically, a ratio comparator technique is taught that functions on the basis of the ratio of the amplitudes of two signals: one proportional to the radar received signal and which contains doppler frequencies at and near zero— and the other proportional to the output of the doppler processor.

U.S. Pat. No. 4,684,950 teaches additional clutter thresholding that cooperatively operates with the basic ratio comparator technique for improving clutter suppression if the suppression is impaired by a limited receiver amplitude dynamic range or by clutter fluctuations caused, e.g., by wind blown trees. The additional thresholding of U.S. Pat. No. 4,684,950 functions specifically on the amplitude of the radar received signal prior to doppler processing, in relation to at least one fixed amplitude level. On the other hand, the present disclosure teaches a noise thresholder employed after doppler processing in operative association with the above-mentioned ratio comparator technique. In this combination, the new invention suppresses both the clutter and noise at the radar output over the full range of clutter and noise mixes, from clutter with imperceptible noise to noise with imperceptible clutter.

U.S. Pat. Nos. 4,459,592 and 4,684,950 teach the use of a CFAR in combination with the ratio comparator technique to provide improved target detection and clutter suppression performance over that attainable with only a CFAR. As discussed later in this disclosure, the present invention has a number of advantages over the ratio comparator/CFAR combination previously taught, including less complexity and greater sensitivity for detecting targets in land and sea clutter.

SUMMARY OF THE INVENTION

It is known from radar experiments and computer simulations, that the ratio comparator technique originally taught in U.S. Pat. No. 4,459,592 provides excellent performance for rejecting ground clutter if, at the output of the doppler processor, the clutter is strong relative to noise. However, its performance for rejecting clutter depends in an inverse manner on the ratio of clutter power to noise power. In other words, the capability of the ratio detector for suppressing a mixture of noise and clutter depends on the clutter to noise ratio, ranging from excellent for the large clutter-to-noise ratios to completely ineffective for noise only. Explanations are given under Detailed Description of the Preferred Embodiments on why the clutter suppression capability of the ratio comparator technique increasingly decreases for smaller values of clutter relative to noise; and how the present invention improves the target detection and clutter suppression capabilities of doppler radars.

The present invention employs a noise thresholder that functions in operative association with the ratio comparator technique. The noise thresholder is operated to reject noise without clutter, and it is therefore ineffective for suppressing noise plus clutter. Similarly, the clutter thresholder (which employs the basic ratio comparator technique) rejects clutter only when it is large compared to noise, and it is ineffective for small clutter-to-noise ratios. By functioning in operative association, the combined thresholders provide a doppler detection system which, for a given false alarm rate due to noise and clutter, permits the reliable detection of weaker targets than would otherwise be possible. Furthermore, these improvements can be obtained by avoiding the inherent complexities of range or doppler CFARs.

To understand how the thresholding and logic circuitry effects on the signals after being outputted from a doppler processor, the reader should recognize the following:

(1) The amplitude differences between the signals from land and/or sea clutter from adjacent and closely spaced range cells can be very large.

(2) The clutter from a range cell, after being outputted from a doppler processor, is noise-like and fluctuates between successively received pulses because of imperfections in clutter suppression and the presence of noise.

Thus, to reject both clutter and noise and yet efficiently detect targets; the system (a) must establish a threshold at each range cell which is independent of the clutter in its neighboring range cells; (b) must adaptively adjust the clutter reject/target detect threshold level in each range cell based on the level of land and/or sea clutter in each said range cell for maximizing target detection versus false alarm rate; and (c) must for the range cells without clutter, for maximizing target detection capability, provide a threshold level which is large enough to reject noise to within a desired false alarm rate.

Two threshold levels are used for the system to accomplish the above tasks, as follows:

a noise threshold level which is established by a reference voltage and has sufficient amplitude above the average noise within the doppler processor output signal, at a given range cell, to obtain a low false alarm rate in the absence of clutter; and a clutter threshold level which is established at each radar range cell by attenuating a signal with magnitude in response to the magnitude of the received signal and which contains doppler frequencies at and near zero, at said each radar range cell effects on the basis of two independent, binary decisions: one within the noise thresholder as to whether or not the magnitude of a doppler processed signal exceeds the noise threshold level; and the other within the clutter thresholder as to whether or not the doppler processed signal exceeds the clutter threshold level. Each of the two binary decisions must be true for there to be radar output, indicating target detection; otherwise the output is rejected, indicating the presence of noise or clutter.

As is illustrated by the preferred embodiments of this disclosure, the thresholding is done in each range/azimuth cell if the doppler processor has only one doppler filter, such as a MTI canceler or a bandpass filter. However, if the processor employs a plurality of bandpass filters, the thresholding can be accomplished in each range/azimuth/doppler cell.

The noise thresholder in operative association with the clutter thresholder serves in several important ways: it provides the thresholding needed for noise rejection in the absence of clutter, it allows the clutter thresholder to reject clutter which is large relative to noise, and it rejects the sum of clutter and noise at any time it is smaller than the noise threshold. The last item is of great importance because (a) it relieves the clutter thresholder of the requirement to reject clutter for the smaller clutter-to-noise ratios, when its clutter suppression capability is ineffective; and (b) this allows a clutter threshold ratio to be selected that permits the detection of smaller target signals relative to clutter than would otherwise be possible.

It is of interest that if operating alone, the noise thresholder would be ineffective for rejecting clutter, and the clutter thresholder would be ineffective for rejecting clutter except if large compared to noise. However, as a consequence of being in operative association, both the noise thresholder reference voltage and the clutter thresholder ratio can be selected to provide a highly sensitive method for detecting target signals that are in the presence of both noise and clutter.

As noted under Background of the Invention, U.S. Pat. No. 4,684,950 teaches clutter thresholding with the basic ratio comparator technique described above in combination with a thresholder that compares the amplitude of the radar received signal (prior to doppler processing) relative to a fixed amplitude level. On the contrary, the present invention employs the aforementioned noise thresholder and it functions on the basis of the amplitude of signals after being doppler processed. Its effect, therefore, is entirely different than the amplitude thresholding taught in U.S. Pat. No. 4,684,950. As already noted, in that patent the amplitude thresholding compares the radar received signal prior to doppler processing with a reference level, because its purpose is to regulate on the basis of the input clutter amplitude; not on the basis of the doppler processed clutter amplitude relative to noise at the doppler processor output, as is the case for the present invention.

The present invention has a number of advantages over the ratio comparator/CFAR combination previously taught in U.S. Pat. Nos. 4,459,592 and 4,684,950, including less complexity and greater sensitivity for detecting targets in land and/or sea clutter. For example, CFAR circuit complexities are incurred to accommodate the lack of robustness for a wide range of land and sea clutter types (see, e.g., G. V. Morris, *Airborne Pulse Doppler Radar*, Artech House, 1988, Chapter 17). Such added complexities are unnecessary in the present invention, because of its inherent noise plus land and/or sea rejection capabilities. Another CFAR loss which the present invention avoids is caused by the CFAR threshold being raised in amplitude by land and/or sea clutter in the range or doppler cells that are sampled for establishing a CFAR threshold. This loss can be avoided with the present invention by establishing a reference voltage level for the noise thresholder at a range where land and/or sea clutter is negligible. Avoided also is the effect on range CFARs of multiple, closely-spaced targets raising the CFAR threshold level that reduces the sensitivity for detecting an individual target.

The objects of the present invention are to provide circuits and methods that:

(1) Will adaptively adjust clutter-plus-noise reject/target detect threshold levels for each radar range cell based on the level of noise and land, and/or sea clutter in each said range cell for maximizing the target detection sensitivity versus false alarm rate.

(2) Will improve the sensitivity of doppler radar for detecting moving targets in the presence of clutter and noise over the performance possible when operating with the doppler ratio detection technique in combination with CFAR circuitry as taught in U.S. Pat. Nos. 4,459,592 and 4,684,950.

(3) Will provide a method for the automatic detection of targets in the presence of clutter and noise that does not require the use of either a range or a doppler CFAR; thereby avoiding their inherent complexities and their lesser capabilities for target detection in a land and/or sea clutter environment.

(4) Will provide a doppler radar detection system that employs both a clutter and a noise thresholder, and a noise thresholder reference voltage level of fixed amplitude.

(5) Will provide a doppler radar detection system that employs both a clutter and a noise thresholder, and a noise thresholder reference voltage level that adaptively responds to changes in internally generated receiver noise plus noise from external sources.

(6) Will provide a doppler radar detection system that employs threshold levels at a plurality of range cells or range/azimuth areas for rejecting fast moving clutter.

(7) Can be used with MTI and pulse doppler radars which use MTI (delay-line) cancelers that process either unipolar video, bipolar video (either single signal or I and Q signals), IF or RF signals.

(8) Can be used with cw doppler radar that uses a bandpass doppler filter or a plurality of bandpass doppler filters.

(9) Can be used with a pulse doppler or a MTI radar which uses a bandpass doppler filter or a plurality of bandpass doppler filters.

(10) Can be used with a pulse doppler or a MTI radar which uses a MTI (delay-line) canceler and a doppler bandpass filter or a MTI (delay-line) canceler and a plurality of bandpass filters.

To accomplish these objects, the subject invention regulates signals that are doppler processed in a manner that permits them to become clutter and noise suppressed radar output. This is done through use of separate threshold levels: one for rejecting the noise which is established with a reference voltage that exceeds noise and the other for rejecting clutter which is established by a ratio of the magnitudes of two signals with different doppler frequency components. Then, if both threshold levels are exceeded, the doppler processed signal is declared a target; otherwise, it is rejected as being due either to clutter and/or noise. The resultant effect is to provide a doppler detection system which, for a given false alarm rate due to land and/or sea clutter, permits the reliable detection of weaker target signals than would otherwise be possible. Furthermore, this enhanced detection performance can be accomplished without the use of either a range or a doppler CFAR; thereby avoiding their inherent complexities, and their lesser capabilities for target detection and land and/or sea clutter rejection.

DETAILED DESCRIPTION OF THE PREFERRED EMBODIMENTS

Figure 1:
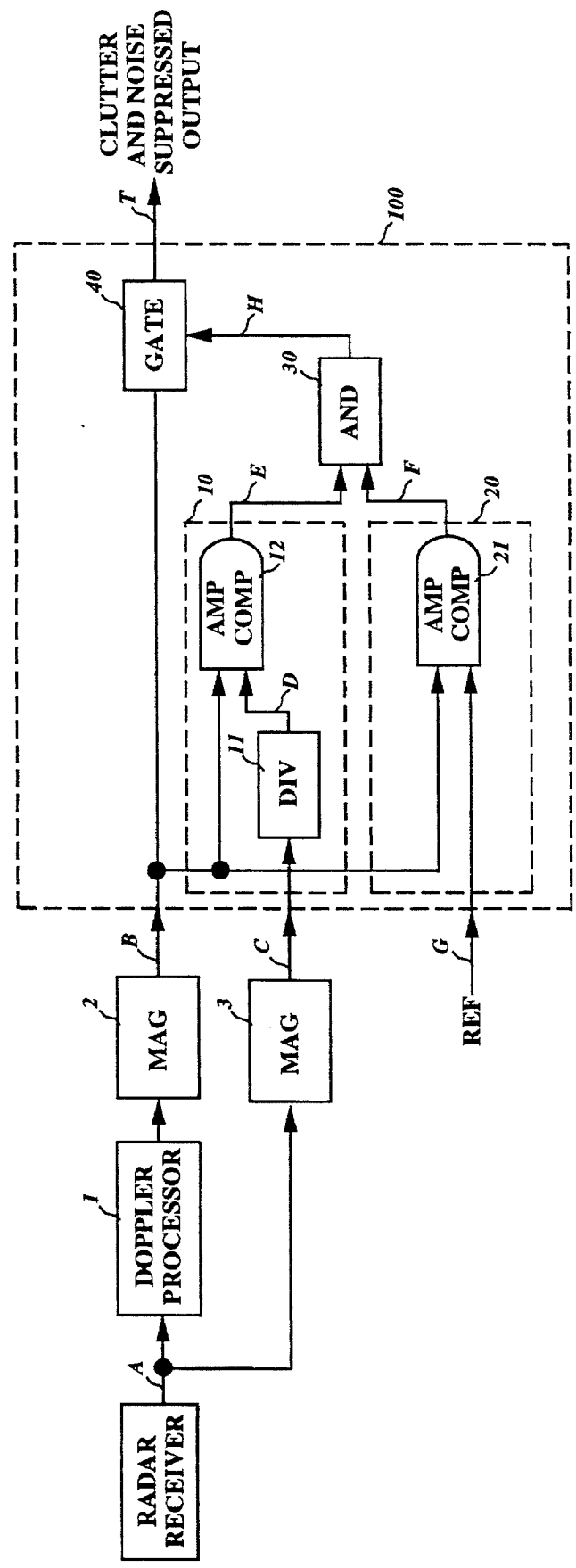
FIG. 1 is a block diagram that illustrates the principal features of an exemplary embodiment of the radar processing system in accordance with the present invention.

FIG. 1 illustrates the principal features of the invention. A doppler radar receiver provides received signal A which is filtered by doppler processor 1 and processed by magnitude detector 2 to provide a doppler filtered unipolar signal B in response to received signal A. Signal B along with signal C and reference voltage G are supplied as input to block 100. Block 100 contains thresholding and logic circuitry that: (1) if signal B is due principally to a target, it is gated on to pass as output signal T; but (2) if signal B is dominated by noise and/or clutter, it is gated off and signal T is rejected for not being due to a target. It is to be recognized that block 100 is continuously responding to signal A via its inputs: signal B, signal C, and reference voltage G. Thus, for a pulse radar, signal A varies with time corresponding to radar range. Then, the processing by block 100 is accomplished by making separate thresholding and logic decisions for each radar range cell.

Now described is the method by which the thresholding and logic circuitry, block 100, effects. Block 100 comprises two thresholders that function in operative association: block 10 is for clutter and is called a clutter thresholder, and block 20 is for noise and is called a noise thresholder. It is subsequently explained how the logic of block 100 causes blocks 10 and 20 to function in operative association, so as to effectively output target signals yet reject both clutter and noise in a mixed noise/clutter/target environment.

As noted from FIG. 1, signal A is processed via two channels: the one that contains signal B and another, wherein signal A is input to magnitude detector 3 that provides unipolar signal C. It is to be noted that (1) signal C is proportional to the magnitude of signal A, and (2) signal B is responsive to the magnitude of signal A because it is obtained after being doppler filtered by doppler processor 1. A doppler processor operates as follows:

1. For a stationary reflecting object, it causes the strength of signal B to be much less than signal A or signal C. Therefore, for a stationary object the ratio of the strengths of signal B to signal C is very small; and 2. For a moving target, the relative strength of signals B and C depends on target velocity, but the ratio of the strengths of signal B to signal C is rarely as small as that ratio for a stationary object.

The clutter thresholder, block 10, is a ratio comparator that follows the teachings of U.S. Pat. Nos. 4,459,592 and 4,684,950. It continuously compares signals C and B within each radar range cell and provides a clutter thresholder output signal E only when the ratio of signal B' to signal C exceeds a predetermined ratio. This predetermined ratio is established by the attenuation of signal C caused by the divider, block 11, which results in the creation of signal D. Specifically, signal E is output from comparator 12 if signal B exceeds signal D, where signal D is obtained by attenuating signal C with divider 11.

The noise thresholder, block 20, comprises amplitude comparator 21 to which signal B and a reference voltage G are input. By this means, signal F is output from amplitude comparator 21 if signal B exceeds reference voltage G. When signal B is dominated by noise, signals B and D fluctuate independently of one another. Then, however, signal B is almost always larger than signal D because (1) of the attenuation of divider 11 and (2) noise, if suppressed, is not strongly suppressed by a doppler processor. Then, for practical purposes the clutter thresholder output E from block 10 is almost always present. Therefore, when the noise in signal B exceeds reference voltage G so that signal F is created at the output of amplitude comparator 21, the almost certain simultaneous presence of signals E and F at AND gate 30 will create signal H with high probability. Thus, the existence of signal H due to noise is then propagated via gate 40, which passes signal B so as to become a noise false alarm at the radar output, signal T. Therefore, when signal B is dominated by noise (and thus thresholder output E is almost always present), to maintain a given low false alarm rate due to noise at the radar output (signal T), it is necessary that the level of reference voltage G exceeds the average noise level of signal B by an amount sufficient to maintain a low false alarm rate for signal F.

Reference voltage G serves three important roles, the first is described immediately above. Namely, it directly limits the generation of false alarms in signals F and H when signal B is dominated by noise. The second role is to reduce the false alarm rate of signal H caused by the combination of noise and clutter within signal B, because then signals E and F are generally not present simultaneously. For this condition, signal H (which requires the simultaneous presence of signals E and F) has a false alarm rate that is considerably less than the false alarm rates of either signal E or signal F.

The third role of reference voltage G is to provide a level below which the sum of clutter and noise is rejected. This role provides much power to the present invention because (a) it relieves the clutter thresholder of the requirement to reject clutter for the smaller clutter-to-noise ratios, when its clutter suppression capability is ineffective; and (b), as will now be addressed, it allows a clutter threshold ratio to be selected that permits the detection of smaller target signals relative to clutter than would otherwise be possible.

The following should be noted: (1) An increase in the attenuation caused by divider 11 decreases the amplitude of signal D. (2) This reduction of signal D permits a smaller target signal to clutter-plus-noise ratio of signal B to generate signal E. (3) This reduction of signal D causes an increase in the false alarm rate of signal E, because signal B fluctuates rapidly (pulse-to-pulse) due to clutter and noise. (4) For proper operation, reference voltage G is relatively large compared to the average receiver noise and therefore single F is generated only when signal B is relatively large compelled to average noise. Thus, (5) signal H and radar output signal T are generated in presence of a target for which signal B exceeds both signal D and reference voltage G. Furthermore, (6) the generation of signal F (as well as signals H and T) is prohibited when signal B is less than reference G. (7) The prohibition of signal H rejects the false alarms that would otherwise be caused by signal E, which occur because of large signal B to signal D ratios (in absence of target) that exist when the clutter-to-noise ratio of signal B is relatively small.

An important aspect of item (7) is that decreases in the clutter-to-noise ratio in signal B cause nonlinear increases in the ratio of signal B to signal D. This, in turn, causes significant increases in the false alarm rate of signal E. To explain the interdependence of these ratios, the following symbols are used in connection with FIG. 1:

A, B, C, and D are the average power levels within a given range cell of signals A, B, C and D, respectively. From FIG. 1 it is seen that signal C is the magnitude of signal A; thus C=A.

Ac, Bc, Cc, and Dc are the average clutter power levels within a given range cell of signals A, B, C and D, respectively.

An, Bn, Cn, and Dn are the average noise power levels within a given range cell of signals A, B, C and D, respectively.

A=Ac+An, B=Bc+Bn, C=Cc+Cn, and D=Dc+Dn since clutter and noise fluctuate independently of one another.

G=the power level of reference voltage G

CR=Ac/Bc and is known as the clutter cancellation ratio k=A/D=C/D and is the factor by which the average power levels of signals A and C are reduced to provide the power of signal D Rn=An/Bn=Cn/Bn and is the ratio of noise power in signals A and C to the noise power in signal B From the definitions above, the relationship between B/D and B/Bn can be obtained as follows:

$$\frac{B}{D} = \frac{\left(\frac{B}{Bn}\right)k}{\left[Rn + CR\left(\frac{B}{Bn} - 1\right)\right]}$$

The reader is reminded that for these discussions on the interdependence of B/D and B/Bn, it is assumed that no target signals are present.

For specificity, parameters are now assumed that are typical of a MTI radar with a three-pulse canceler, as follow: $CR=10^3$ and Rn=6, corresponding to 30 dB and 7.8 dB, respectively. From FIG. 1 it is apparent that if signal E is to be rejected by the presence of clutter, signal D must exceed signal B. Thus, the value k by which signal C is attenuated by divider 11 must be selected so that it is exceeded by the clutter cancellation ratio CR. Values of k equalling 100, 200, and 400, corresponding to 20 dB, 23 dB, and 26 dB, respectively, are used below to illustrate its effect on the ratio B/D. Calculated values of B/D versus B/Bn are now given based on the equation above and the assumed values for CR, Rn, and k.

| B/Bn in dB | B/D in dB (k = 100) | B/D in dB (k = 200) | B/D in dB (k = 400) |
|---|---|---|---|
| 0.1 | 6.1 | 9.1 | 12.1 |
| 1.0 | −3.3 | 0.0 | 3.0 |
| 3.0 | −7.0 | −4.0 | −1.0 |
| 6.0 | −8.7 | −5.7 | −2.7 |
| 9.0 | −9.4 | −6.5 | −3.3 |
| 12.0 | −9.7 | −6.7 | −3.7 |
| 15.0 | −9.8 | −6.8 | −3.8 |
| 18.0 | −9.9 | −6.9 | −3.9 |

From these ratios it is seen that B/D increases rapidly for decreasing values of B/Bn less than 3 dB, i.e., when Bc is less than Bn. Of significance is the fact that B/D changes slowly with changes in B/Bn if B/Bn is large, e.g., above 9 dB.

The reader is reminded that signal B fluctuates rapidly. However, it should now be apparent that decreases in the clutter amplitude relative to noise in signal B cause increases in the clutter amplitude in signal B relative to signal D. This means that reference voltage G can be used to reject signal F for the smaller values of signal B, and this will prohibit the generation of signal H that would otherwise be caused by the presence of signal E due to the larger ratios of signal B to signal D. Then, the ratio CR/k can be selected so that the average of signal B is well below signal D for the larger ratios of signal B to noise, thereby assuring only a small false alarm rate due to clutter because signal B would rarely exceed signal D. Therefore, since reference voltage G provides a level below which the sum of clutter and noise is rejected, a clutter threshold ratio can be selected through use of divider 11 of FIG. 1 that permits the detection of smaller target signals relative to noise than would otherwise be possible.

Figure 2:
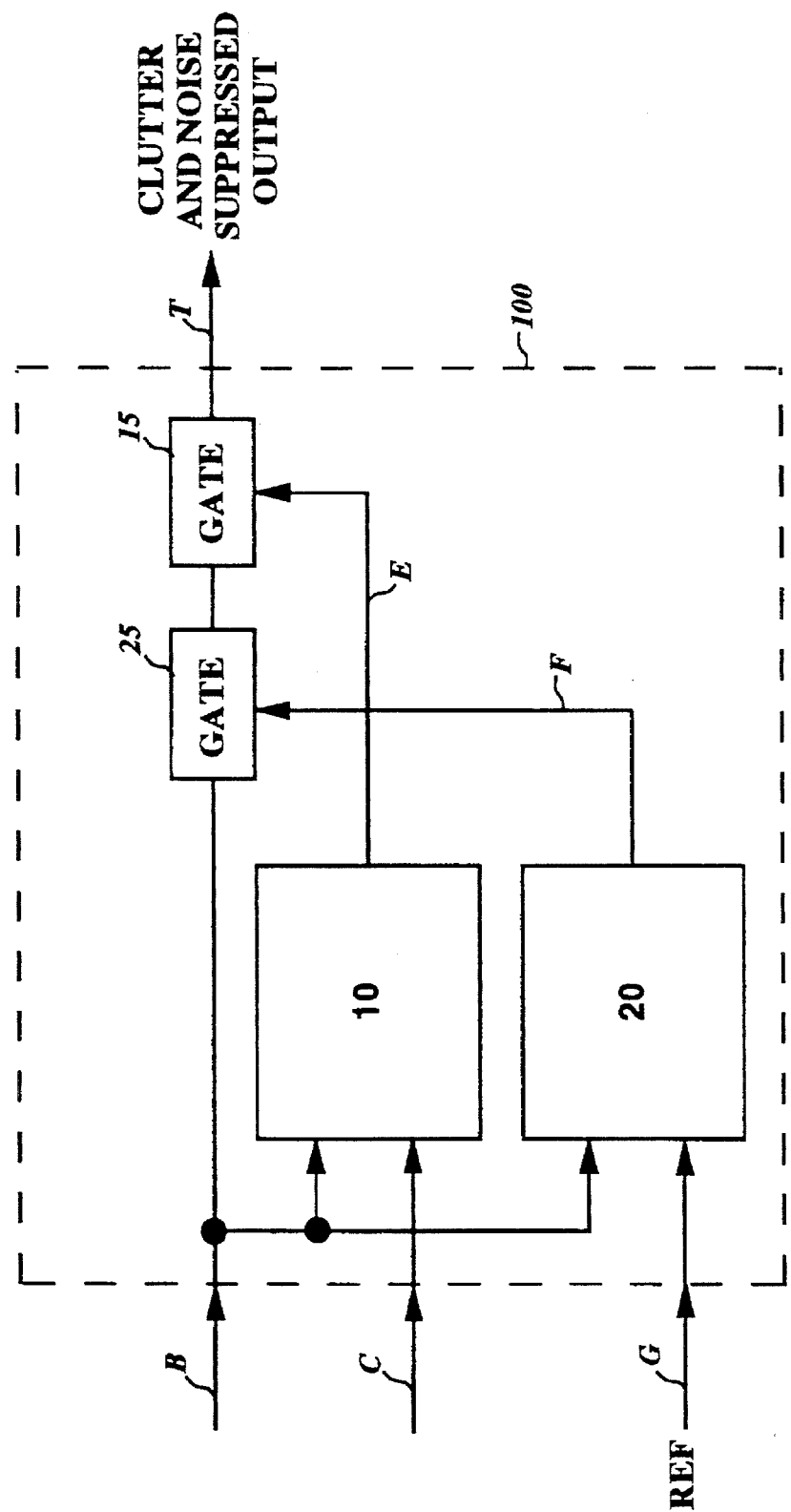
FIG. 2 is an alternate block diagram for the thresholding and logic circuitry, block 100.

FIG. 2 is an alternate block diagram for the thresholding and logic circuitry, block 100, of FIG. 1. As in FIG. 1, signal B, signal C, and reference voltage G are input to and signal T is output from block 100 of FIG. 2. Furthermore, blocks 10 and 20 of FIGS. 1 and 2 are identical. It is also to be noted that gate 25 is gated on for passing signal B if signal F is output. Similarly, gate 15 is gated on if signal E is output. Thus, it can be seen from FIG. 2 that signal T is output if both signals E and F are output. Furthermore, signal T is not output if either signal E or signal F is not output. Therefore, block 100 of FIG. 2 functions exactly like block 100 of FIG. 1.

Figure 3:
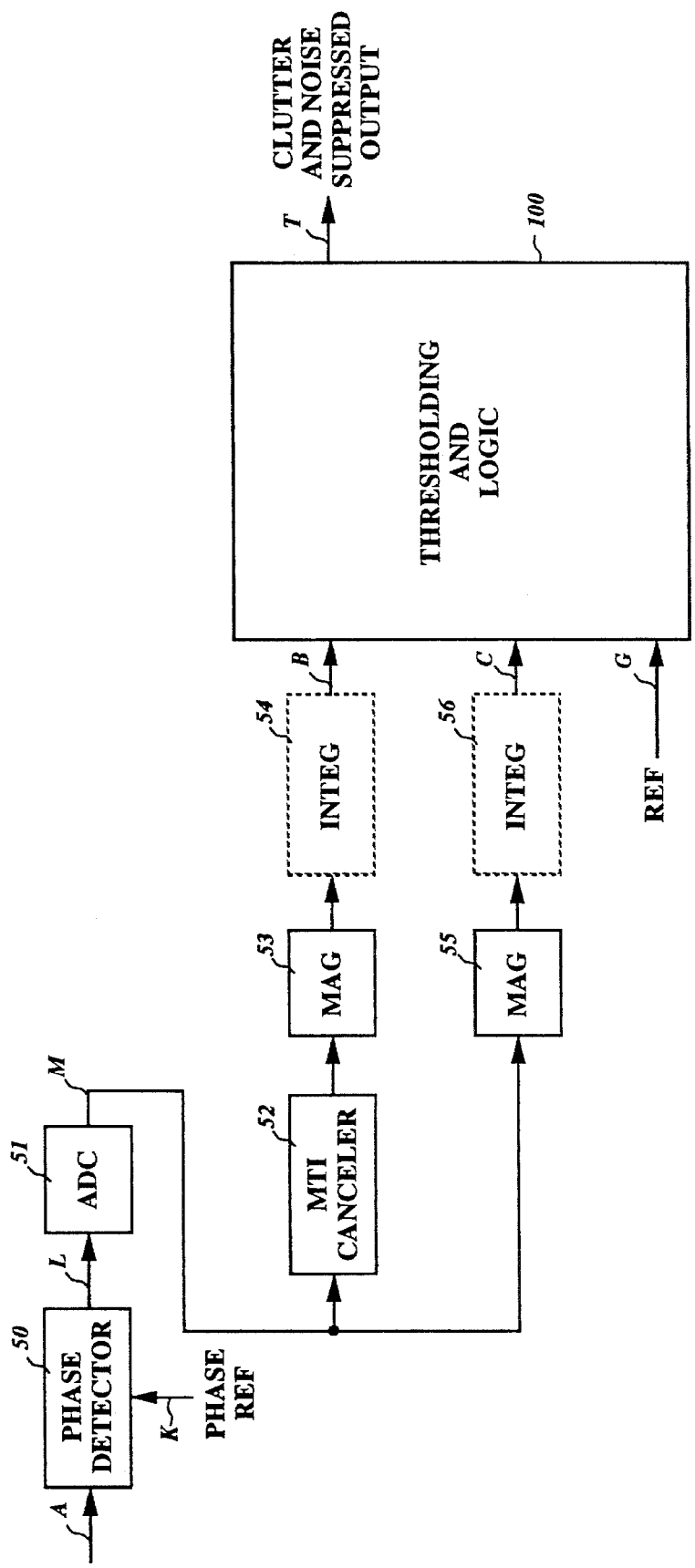
FIG. 3 is a block diagram that illustrates use of the basic radar detection system invention in operative association with a MTI canceler.

FIG. 3 illustrates a preferred embodiment when the thresholding and logic circuitry, block 100, is used with a MTI canceler. The received IF signal A is processed by phase detector 50 with phase reference signal K to provide a bipolar output signal L which is converted to digital words via analog-to-digital converter 51 to provide bipolar digital signal M for processing digitally. Signal M is processed via two parallel paths, one for generating a unipolar signal B and the other for generating the unipolar signal C. For generating signal B, signal M is doppler filtered by MTI canceler 52. Then, its magnitude is obtained from magnitude detector 53, and this magnitude signal is integrated by integrator 54. In addition, unipolar signal C is generated by obtaining the magnitude of signal M with magnitude detector 55 and by integrating with integrator 56.

Integrators 54 and 56 are included for reducing the degree of fluctuations in signals B and C. Although optional, they provide improvements for detecting weak target signals in noise. Ordinarily, for most MTI cancelers the cancellation ratio CR is so large that if the clutter amplitude equals average noise or larger within signal B, signal C will for practical purposes be devoid of fluctuations. Therefore, even though integrator 54 significantly reduces the fluctuations in signal B, ordinarily the benefits of using integrator 56 for reducing the fluctuations in signal C will be negligible. At any rate, whether or not the integrators are included, signals B and C are unipolar signals each with amplitude proportional to the amplitude of signal A. Signals B, C and reference voltage G are each input to block 100. The functioning of these signals with block 100 has already been described in connection with FIG. 1.

Figure 4:
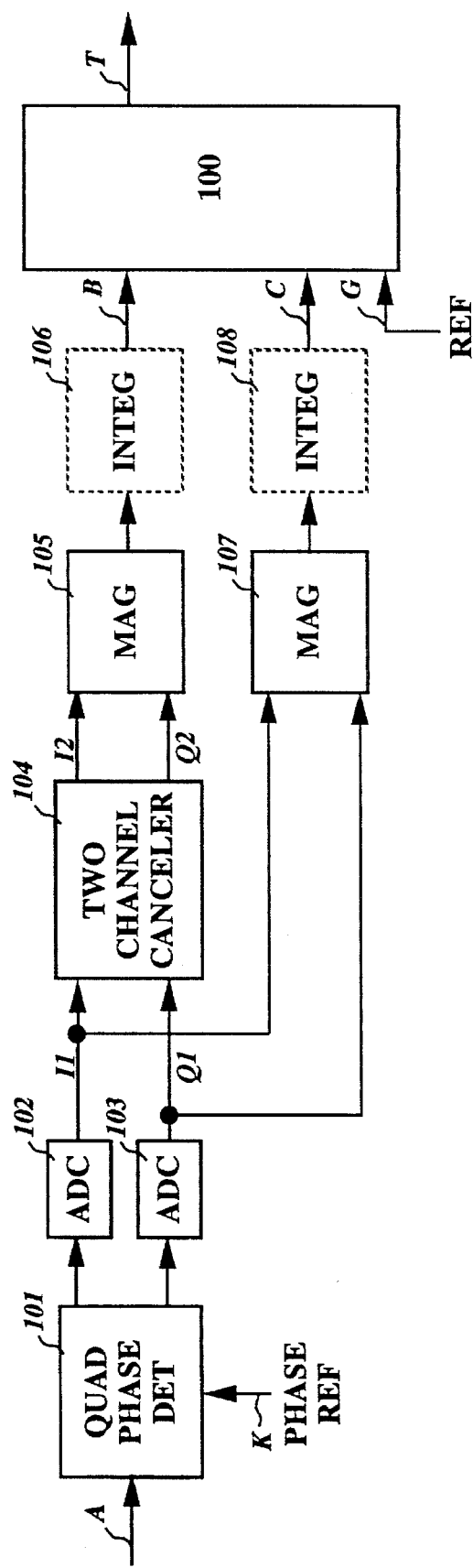
FIG. 4 is a block diagram that illustrates use of the basic radar detection system invention in operative association with a two-channel MTI canceler.

FIG. 4 illustrates a preferred embodiment of the invention when used with a two channel (I and Q) MTI processor of the type described by Skolnik, 1980, pp., 119–120. Signal A is a received IF signal, quadrature phase detector 101 with phase reference K generates I1 (in-phase) and Q1 (quadrature) bipolar video signal components with amplitudes proportional to signal A, blocks 102 and 103 are analog-to-digital converters, and block 104 is a two-channel MTI canceler that provides separately filtered in-phase and quadrature bipolar signal components I2 and Q2. In addition, the filtered signals (I2 and Q2) and the unfiltered signals (I1 and Q1) are input to magnitude detectors 105 and 107, respectively. Each magnitude detector provides as output the square root of the sum of the squares of the amplitudes of its respective quadrature signals. The outputs of magnitude detectors 105 and 107 are input to integrators 106 and 108, which are included for reducing the degree of fluctuations in the integrator outputs (signals B and C). As noted in connection with FIG. 3, these integrators are optional but they can provide improvements for detecting weak target signals. Whether or not the integrators are included, signals B and C are unipolar signals each with amplitude proportional to the amplitude of signal A. Signals B, C and reference voltage G are each input to block 100, as noted previously in connection with FIG. 1. Thus, in accordance with FIG. 1, signal T of block 100 in FIG. 4 is noise and clutter suppressed radar output.

Figure 5:
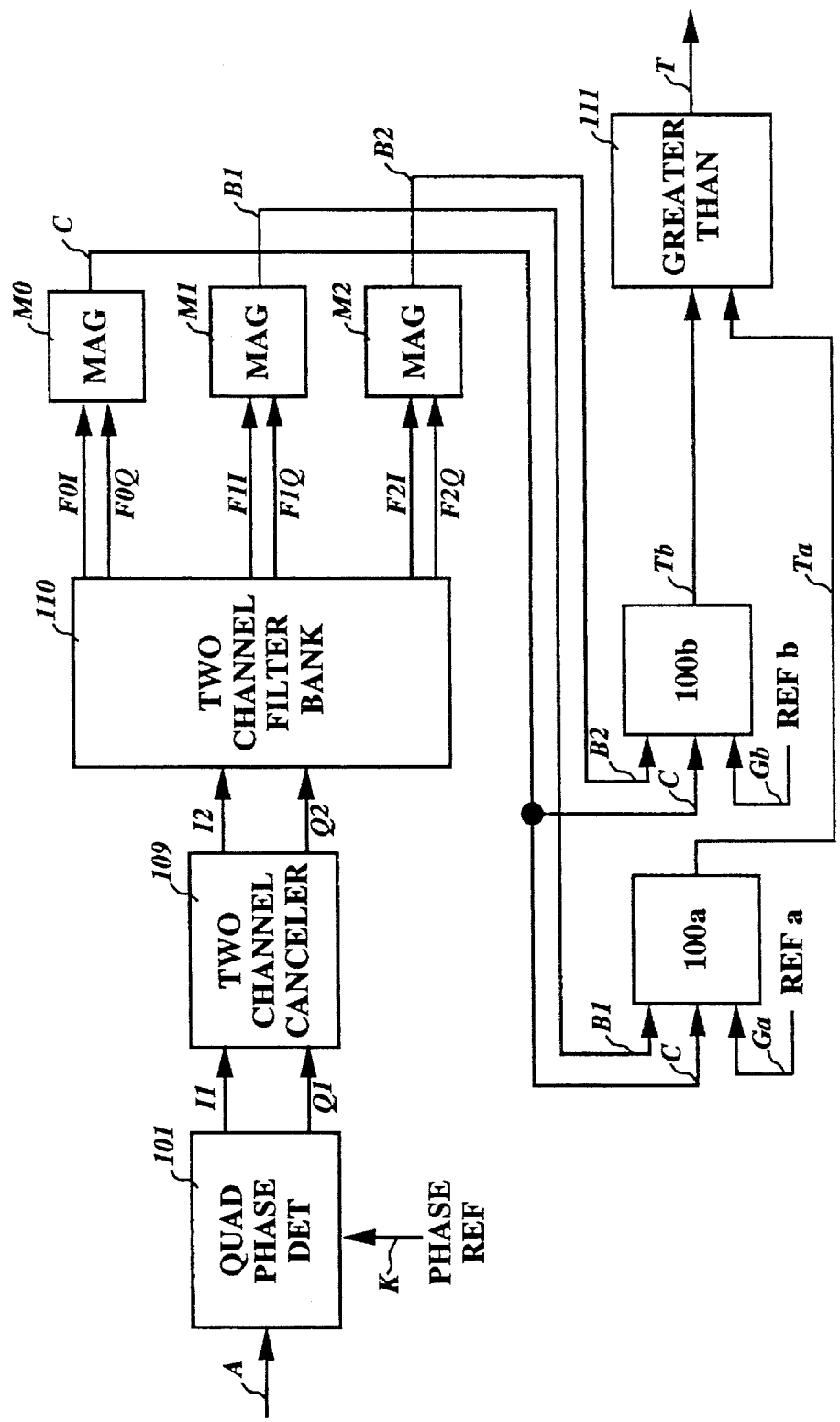
FIG. 5 is a block diagram that illustrates use of the basic radar detection system invention in operative association with a two-channel doppler filter bank cascaded with a two-channel MTI canceler.

FIG. 5 illustrates a doppler processor that comprises a two-channel doppler filter bank (block 110) cascaded with a two-channel MTI canceler (block 109). The functioning of the quadrature phase detector, block 101, and the two channel canceler, block 109, for generating the suppressed in-phase and quadrature signals I2 and Q2 from input IF signal A has already been explained in connection with FIG. 4. These suppressed I2 and Q2 components are input to the two-channel doppler filter bank, block 110, wherein further filtering is accomplished by outputting the I and Q components corresponding to the passband center frequencies F0, F1, and F2; namely, F0I, F0Q, F1I, F1Q, F2I, F2Q.

It is assumed that doppler filter bank block 110 is comprised of two transversal filters (one for the I component and the other for the Q component) for filtering signals from all of the radar ranges (see, e.g., Skolnik, 1980, pp. 121–123). The FFT (fast Fourier transform) filter is a well-known type of transversal filter, and it is commonly used as a doppler filter bank. There are three magnitude detectors (M0, M1, M2). The I and Q components (from each filter bank) for each center frequency are input to their respective magnitude detector (e.g., F0I and F0Q input to M0, etc.) for providing the signal magnitudes for the three center frequencies F0, F1, F2. The magnitude of the output from this two-channel filter bank which is centered at zero frequency is designated C, and the other outputs are designated B1 and B2, corresponding to the passbands removed from zero frequency.

The operation of the doppler processor will now be explained. Canceler 109 supplies signals I2 and Q2 as output by providing high attenuation if signal A is due to a fixed or slowly moving object and provides much less attenuation, on-the-average, if signal A is due to a moving target. Filter bank 110 processes signals I2 and Q2 and finally signals C, B1, and B2 are provided. Signal C is due to fixed or slowly moving objects. On the other hand, signals B1 and B2 are due principally to the more rapidly moving targets of interest. An advantage of using bandpass filters, in addition to the MTI canceler, is that a signal B1 or B2 from a target must compete only with the spurious clutter and noise in its own passband, centered at either F1 or F2.

The design of FIG. 5 is based on providing a target signal at the output of either magnitude detector (M1 or M2), depending on the target doppler frequency. Therefore, thresholding and logic circuitry of the block 100 type (FIG. 1) is included at the output of both the M1 and M2 magnitude detectors to effect clutter and noise suppression. As is apparent from FIG. 5; signal B1, signal C, and reference voltage Ga are provided as inputs to thresholding and logic circuitry, block 100a; similarly, signal B2, signal C, and reference voltage Gb are provided to block 100b. Then, the outputs of blocks 100a and 100b provide clutter and noise suppressed target output signals Ta and Tb. In order to output the largest of signals Ta and Tb if both are present within a given radar range cell, they are provided as input to "greater than" logic, block 111. Then, the output of block 111 is a clutter and noise suppressed target signal T. It should now be apparent that the levels of reference voltages Ga and Gb should exceed the average noise levels of signals B1 and B2, respectively, irrespective of the clutter amplitude. In other words, reference voltages Ga and Gb must be large enough to reject noise in the absence of clutter, to satisfactorily effect low false alarm rates for signals Ta, Tb, and T.

Descriptions of ways to implement reference voltage G and noise thresholder, block 20, follow. Reference voltage G may be of fixed amplitude. This can be satisfactory for modern, manually operated radars which are usually very stable. The preferred noise thresholder, block 20, is adaptive so that it responds to changes in the internally generated receiver noise, and to noise caused by intentional jamming or by some other external noise source. One method to obtain adaptivity is to establish reference voltage G at one range through use of an integrator that samples signal B over time. Another means for obtaining an adaptive reference voltage G is to sample the outputs of a number of doppler filters at a fixed range. For the above described adaptive means, the sampled signals (and hence reference voltage G) should not be contaminated by radar echo from either a target or clutter. Therefore, reference voltage G is best established at a range cell located at long range, where there is only a small likelihood of the occurrence of target or clutter echo of appreciable magnitude.

Figure 6:
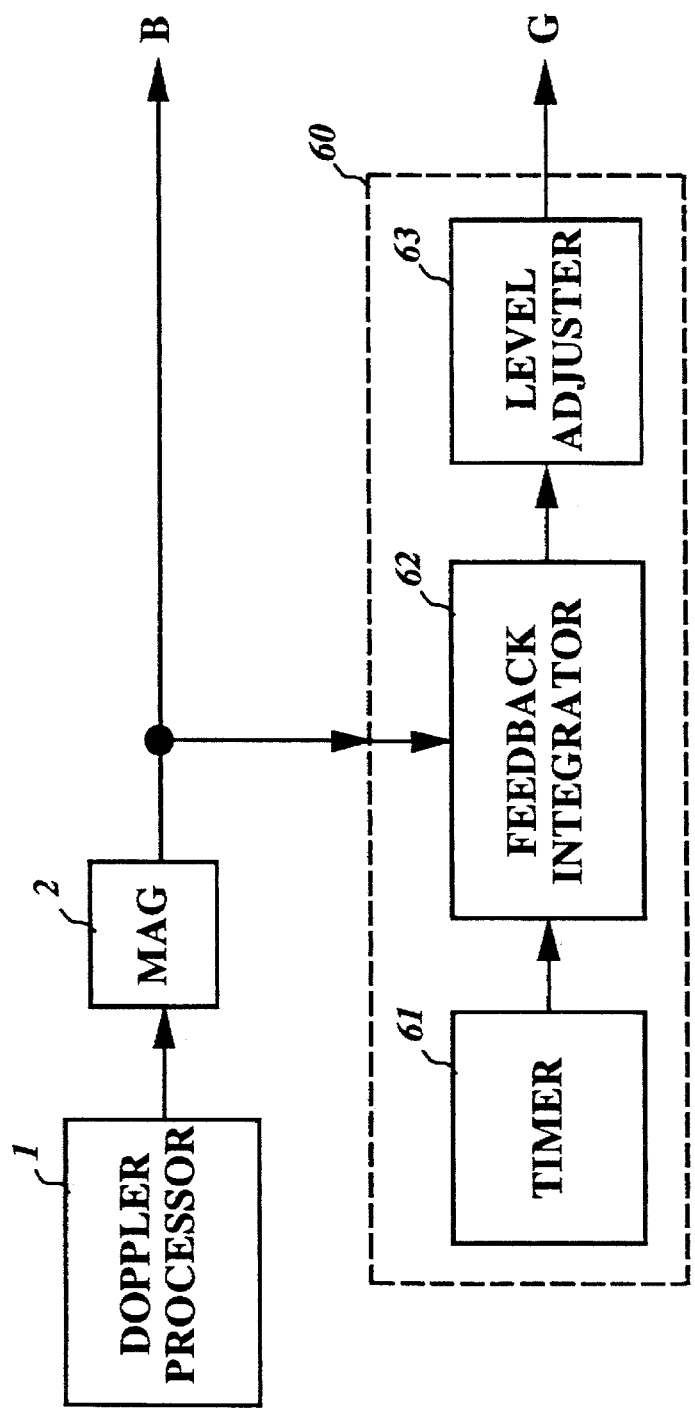
FIG. 6 is a block diagram that illustrates means for generating a reference voltage that periodically samples in time.

FIG. 6 illustrates the use of a feedback delay-line integrator, block 62, to obtain reference voltage G at one range cell and to use it for all ranges. Timer 61 activates feedback delay-line integrator 62 for each received pulse at a fixed range cell so that integrator 62 can sum samples of signal B obtained periodically from successively received pulses (see, e.g., Skolnik, pp. 390–391). Then, the running sum of the samples of signal B at a fixed range from integrator 62 are input to level adjuster 63, so that its output reference voltage G can be adjusted and set with appropriate level for providing the desired low false alarm rate of signal F (FIGS. 1 and 2). Thus, a timing signal from timer 61 causes a new reference voltage G to be established during each range sweep; and this new voltage is used as the reference voltage G for each successively generated range cell until another new one is established on the next range sweep. Therefore, block 60 is an adaptive reference voltage means comprised of an integrator for periodically summing signal B obtained from one range cell.

Figure 7:
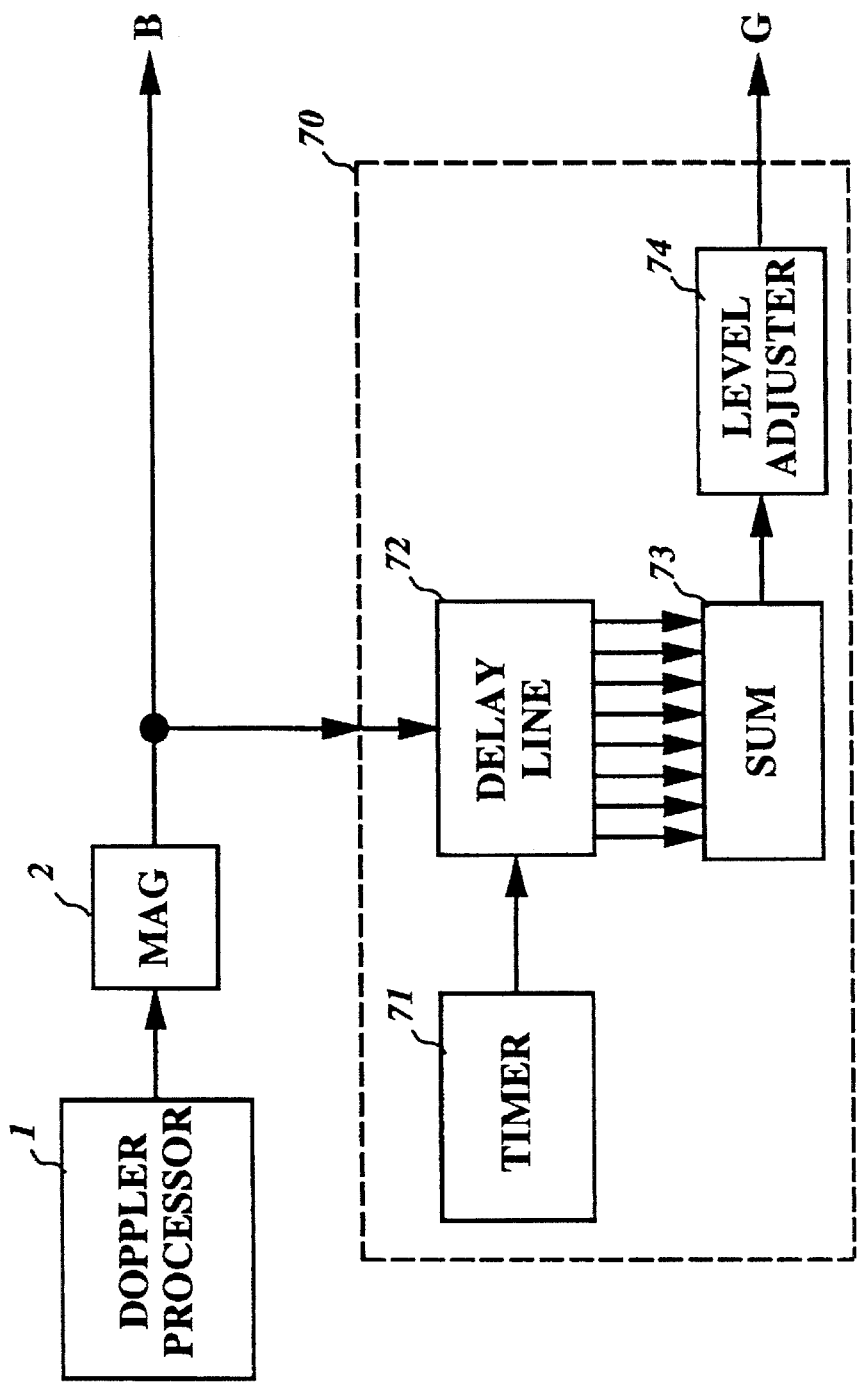
FIG. 7 is a block diagram that illustrates means for generating a reference voltage that samples different radar range cells.
Figure 8:
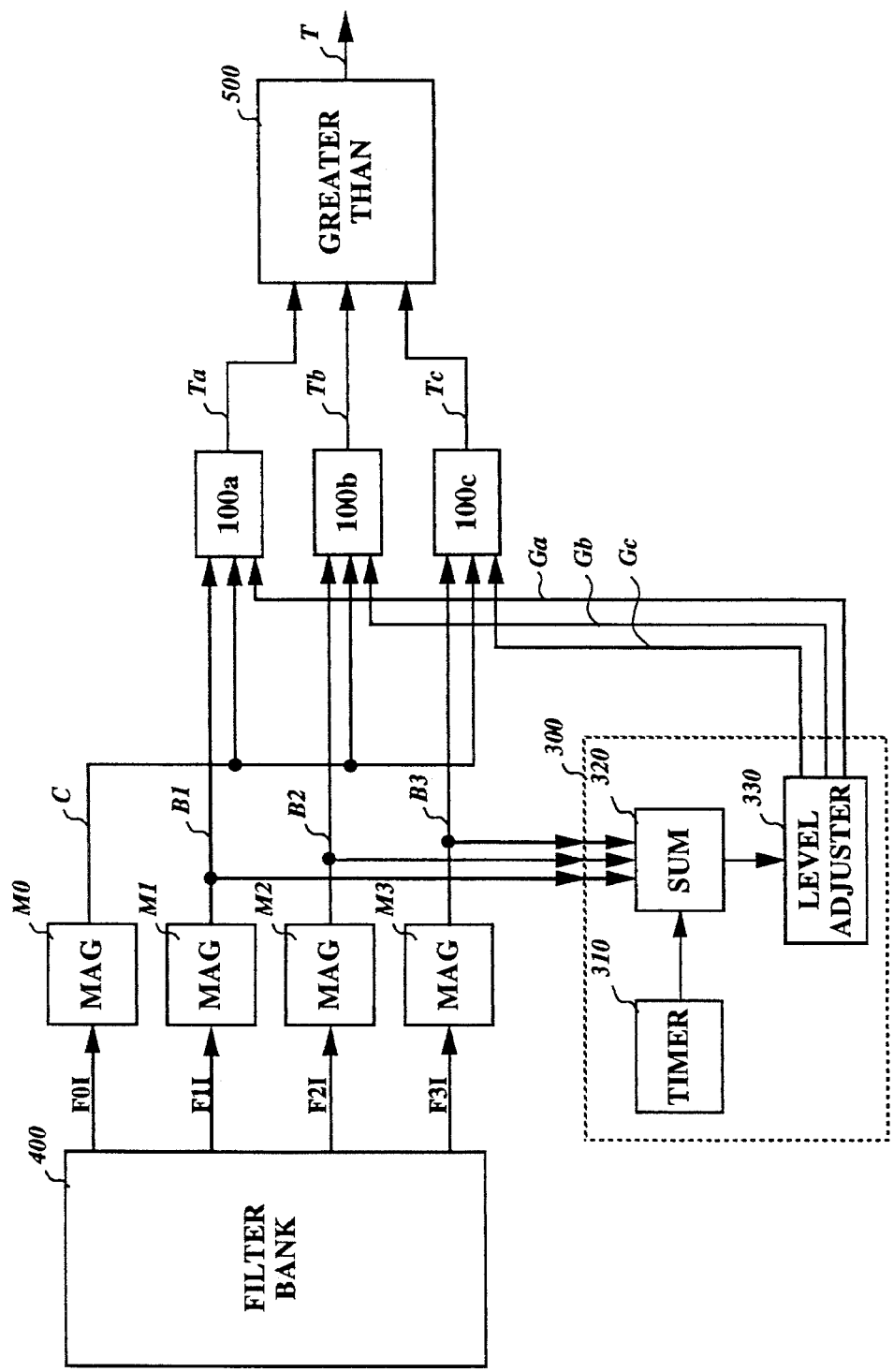
FIG. 8 is a block diagram that illustrates means for generating a reference voltage that samples different bandpass filters.

As for FIG. 6, FIGS. 7 and 8 (now to be described) can be used to establish only one new reference voltage G for the range cells during a range sweep. Alternately, they can be used to describe how different values of reference voltage G can be established at different range cells during a range sweep. It is to be noted that if a new value of reference voltage G were established and used in each range cell, then the combination of such a range dependent reference voltage with blocks 20 and 25 of FIG. 2 would function as a CFAR. Although U.S. Pat. Nos. 4,459,592 and 4,684,950 teach the combination of the basic ratio comparator and a CFAR, they do not teach the embodiments for and uses of reference voltage G as taught in the present disclosure.

FIG. 7 illustrates an adaptive reference voltage means that samples signal B at different radar range cells to obtain sampled signals and sums these sampled signals. Signal B, obtained from doppler processor 1 via magnitude detector 2, is input to a delay-line, block 72. Timer 71 activates integrator 72 to receive samples of signal B over an interval of range cells during a range sweep. Then, these samples of signal B are delayed from one another so that they are simultaneously received and summed in block 73. The sum is retained by block 73 until another sum is acquired during the next range sweep. In this way a sum voltage is always available to level adjuster, block 74. This sum voltage is then adjusted and set in amplitude by level adjuster 74, so that it will output reference voltage G with appropriate level for providing the desired low false alarm rate of signal F (FIGS. 1 and 2). Thus, block 70 is an adaptive reference voltage means that samples signal B at different radar range cells during a range sweep to obtain sampled signals and sums said sampled signals.

FIG. 8 illustrates a means for providing an adaptive reference voltage that, at one range cell, samples and sums the doppler processed signals from different bandpass filters of a filter bank. A filter bank, block 400, provides the outputs F0I, F1I, F2I, and F3I of four different bandpass filters; and monopolar signals C, B1, B2, and B3 are obtained via magnitude detectors M0, M1, M2, and M3. Signal C is obtained from a bandpass filter that passes a band of frequencies that includes zero frequency, and is supplied as input to the thresholding and logic circuitry (blocks 100a, 100b, and 100c) for further processing of each of the doppler processed signals B1, B2, and B3. Block 300 is a reference voltage means that supplies reference voltages Ga, Gb, and Gc to each of the blocks 100a, 100b, and 100c. The outputs Ta, Tb, and Tc are then supplied to block 500 for selecting the largest of them for providing the clutter and noise suppressed output, signal T. It is to be noted that signals B1, B2, and B3 are supplied to the reference voltage means, block 300, to be summed in block 320. Timer 310 activates block 320 so that it sums signals B1, B2, and B3 at a specific range cell. The sum is retained until another sum is acquired by block 320 during the next range sweep. In this way a sum voltage is always available to the level adjuster, block 330. Block 330 is used to adjust and set the amplitudes of Ga, Gb, and Gc to appropriate levels for providing the desired low false alarm rates for signals Ta, Tb, Tc, and T. Thus, block 300 is an adaptive reference voltage means that samples and sums, at one range cell, the doppler processed signals B1, B2, and B3 which are from different bandpass filters.

As previously discussed, for suppression of land and/or sea clutter, reference voltage G must be set above the average noise level of signal B (yet not above the level of land and/or sea clutter in signal B). When the noise within a receiver is independent of range, as is usually the case, reference voltage G needs only to be established at one range. Thus, with the presence of noise from external sources including jammers, reference voltage G usually needs only to be established for one range cell. There are cases, however, where system performance argues for reference voltage G being adaptive at a plurality of ranges. One case being when the receiver gain changes as a function of range. Another is when clutter from fast-moving windblown chaff and/or rain is present., The need for time/range adaptivity when the receiver gain changes is considered obvious, but the case of fast moving clutter is now discussed.

As with moving targets, the ratio of signal B to signal C for fast moving clutter may be large enough to activate signal E (FIGS. 1 and 2). Thus, for strong moving clutter, signals E and F may be simultaneously present and thereby create clutter false alarms in signal T. Therefore, for range/azimuth areas where moving clutter is apparent in signal B, it is desirable that reference voltage G be made a function of both time and range so that block 20 can reject signal F. Block 20 would then support the clutter thresholder, block 10 (which provides for the rejection of the land and/or sea clutter), in cooperative association for providing clutter and noise suppressed radar output, signal T.

The reader should recognize that the radar sensitivity for target detection is degraded when reference voltage G is adaptively (not of fixed amplitude) established at a range cell where the land and or/sea clutter exceeds noise in signal B. This is because the land and/or sea clutter will raise reference voltage G, which thereby raises the level of signal B required for target detection. Thus, when not needed for rejecting chaff and/or rain clutter, the use of adaptive reference voltages at a multiplicity of range cells should be avoided. Fortunately, because of the area extensive nature of chaff and/or rain clutter, their strengths change only gradually (contrary to land and/sea clutter) with changes in range. Therefore, only enough different values of the adaptive reference voltage are needed, for use at different ranges, to provide the general profile of signal strength for chaff and/or rain clutter versus range.

FIGS. 7 and 8 are described above for establishing only one new reference voltage G during a range sweep. They will now be used to describe the establishment of new values of reference voltage G at a plurality of range cells during each range sweep. Recall that for both FIGS. 7 and 8, a timing signal causes reference voltage G to be established at a specific range cell and the said reference voltage G is then used for each successive range cell until the next value of reference voltage G is established on the succeeding range sweep. Alternately, timers 71 and 310 of FIGS. 7 and 8, respectively, can each generate a timing signal to cause, on each range sweep, a new reference voltage G to be established, on operator command, at each of a plurality of additional range cells. In the case of a radar with an antenna that scans, timers 71 and 310 of FIGS. 7 and 8, respectively, can also be coordinated with azimuth pointing direction so that the plurality of operator selected range cells will only be activated for selected azimuth directions.

Thus, as has now been described, timers 71 and 310 of FIGS. 7 and 8, respectively, can be used to facilitate the establishment of a plurality of different values of reference voltage G for designated ranges or for designated range/azimuth areas. In this way, the loss in target detection capability, caused by land and/or sea clutter raising adaptive reference voltages, can be restricted to designated range intervals or range/azimuth areas.

In designing radar detection systems that employ applicant's invention, the signal processing practise of compensating for relative signal delays with delay lines will sometimes be necessary. For example, the basic invention simultaneous compares signals obtained via separate channels that employ components that ordinarily have different transit times. Therefore, it may be necessary to add delay lines to equalize the transit times between channels. For example, the channels used to supply signals B and D to amplitude comparator 12 in FIG. 1 are comprised of different signal processing components: both include a magnitude detector but one includes a doppler processor and the other a divider. Since the transit time within a doppler processor is ordinarily larger than for a divider, for this example a delay line added somewhere within the channel providing signal D could be used to equalize the transit times of the two channels.

Although the block diagrams of FIGS. 3 and 4 are the only ones shown herein that depict analog-to-digital conversion, most modern signal processors employ digital doppler processing. It is to be understood, therefore, that all of the system embodiments of this disclosure can, in principle, employ digital processing.

The above described embodiments of the improved doppler radar detection system, which are illustrated in FIGS. 1-8, may be used in practicing the improved method of doppler radar detection in accordance with the present invention. The method comprises the steps of providing a received signal with doppler frequency components in response to radar echoes; frequency filtering said received signal and providing at least one filtered signal; providing a first signal having doppler frequencies at and near zero with magnitude in response to the magnitude of the said received signal; providing a second signal with magnitude proportional to the magnitude of a filtered signal of the said at least one filtered signal; comparing the first and second signals and providing a clutter thresholding output signal of a first level only when the ratio of the second signal magnitude to the first signal magnitude is less than a predetermined value and of a second level whenever this ratio exceeds the predetermined value; providing a reference voltage that exceeds the average noise voltage of said second signal; comparing the second signal and the reference voltage and providing a noise thresholding output signal of a first level only when the second signal is less than the reference voltage and of a second level whenever the second signal exceeds the reference voltage; and selectively passing a radar output signal constituting a clutter and noise suppressed radar output only if both the clutter thresholding output signal and the noise thresholding output signal are of the second level.

The method of providing improved doppler radar detection may include employing a unipolar video signal, a bipolar video signal, an IF signal or a RF signal as the received signal.

The method of providing improved doppler radar detection may additionally include receiving transmitted radar waves that are either continuous waves or pulsed.

The method of providing improved doppler radar detection may additionally include producing the filtered signal by providing bandpass filtering with minimum attenuation for a band of doppler frequency components wherein said band is not centered at zero frequency.

The method of providing improved doppler radar detection may additionally include producing the filtered signal by providing a filtered signal that has been integrated.

It is understood that the illustrative embodiments discussed above and illustrated in the accompanying drawings have been set out by way of example, not by way of limitation. Numerous other embodiments and variants are possible without departing from the spirit and scope of the invention, its scope being defined by the appended claims.

What is claimed is:

1. A radar detection system for processing the received signal from a radar receiver—to detect moving targets while suppressing clutter and noise; said clutter being radar echo signals from stationary and slowly moving objects of land or sea having small doppler frequencies including frequencies at and near zero, and said noise being randomly fluctuating signals having wide doppler spectra including zero frequency; comprising:

doppler processor means for frequency filtering the received signal and providing at least one filtered signal in response to the said received signal;

means of providing a first signal having doppler frequencies at and near zero frequency with magnitude in response to the magnitude of the said received signal;

means of providing a second signal with a magnitude in response to the magnitude of a filtered signal of said at least one filtered signal;

clutter thresholder means for comparing the first and second signals and for providing a clutter thresholder output signal of a first level only when the ratio of the second signal magnitude to the first signal magnitude is less than a predetermined value and of a second level whenever this ratio exceeds the predetermined value;

reference voltage means for providing a reference voltage with magnitude that exceeds the noise level of said second signal;

noise thresholder means for comparing the second signal magnitude and magnitude of the reference voltage for providing a noise thresholder output signal of a first level only when the second signal magnitude is less than the magnitude of the reference voltage and of a second level whenever the second signal magnitude exceeds the magnitude of the reference voltage; and radar output means for selectively passing a radar output signal constituting a clutter and noise suppressed radar output only in the presence of both the clutter thresholder output signal and the noise thresholder output signal being of the second level.

2. A radar detection system according to claim 1, wherein the means for providing said first signal is comprised of a filter for passing a band of frequencies that includes zero frequency.

3. A radar detection system according to claim 1, wherein the reference voltage means is comprised of a voltage source of fixed magnitude.

4. A radar detection system according to claim 1; wherein the reference voltage means is comprised of an integration means and a timing means that function in operative association to periodically sample at a radar range cell the second signal on recurring range sweeps to obtain sampled signals and to aggregate the magnitudes of said sampled signals for providing a reference voltage at a radar range cell during a radar range sweep.

5. A radar detection system according to claim 1; wherein the reference voltage means is comprised of a delay and summing means that samples said second signal at a plurality of different radar range cells to obtain sampled signals, and aggregates the magnitudes of said sampled signals for providing a reference voltage at a radar range cell during a radar range sweep.

6. A radar detection system according to claim 5; wherein the reference voltage means is comprised of a timer means that functions in operative association with said delay and summing means and generates a timing signal to cause a new reference voltage to be established at each of a plurality of radar range cells during a radar range sweep.

7. A radar detection system according to claim 1; wherein the doppler processor means is comprised of a plurality of filters; and the reference voltage means is comprised of a summing means that samples signals from different filters of said plurality of filters to obtain sampled signals, and aggregates the magnitudes of said sampled signals for providing a reference voltage at a radar range cell during a radar range sweep.

8. A radar detection system according to claim 7; wherein the reference voltage means is comprised of a timer means that functions in operative association with said summing means and generates a timing signal to cause a new reference voltage to be established at each of a plurality of radar range cells during a radar range sweep.

9. A method of doppler radar detection of moving targets and for suppressing clutter and noise; said clutter being radar echo signals from stationary and slowly moving objects of land or sea having small doppler frequencies including frequencies at and near zero, and said noise being randomly fluctuating signals having wide doppler spectra including zero frequency; comprising the steps of:

providing a received signal with doppler frequency components in response to radar echoes;

frequency filtering said received signal and providing at least one filtered signal;

providing a first signal having doppler frequencies at and near zero frequency with magnitude in response to the magnitude of the said received signal;

providing a second signal with magnitude in response to the magnitude of a filtered signal of said at least one filtered signal;

comparing the first and second signals and providing a clutter thresholding output signal of a first level only when the ratio of the second signal magnitude to the first signal magnitude is less than a predetermined value and of a second level whenever this ratio exceeds the predetermined value;

providing a reference voltage with magnitude that exceeds the noise level of said second signal;

comparing the second signal and the reference voltage and providing a noise thresholding output signal of a first level only when the second signal magnitude is less than the magnitude of the reference voltage and of a second level whenever the second signal magnitude exceeds the magnitude of the reference voltage;

selectively passing a radar output signal constituting a clutter and noise suppressed radar output only if both the clutter thresholding output signal and the noise thresholding output signal are of the second level.

10. A method of doppler radar detection of a received signal according to claim 9, wherein the step of providing a first signal with magnitude in response to the magnitude of the said received signal includes frequency filtering for passing a band of frequencies that includes zero frequency.

11. A method of doppler radar detection of a received signal according to claim 9, wherein the step of providing a reference voltage includes supplying a voltage of fixed magnitude.

12. A method of doppler radar detection of a received signal according to claim 9, wherein the step of providing a reference voltage includes periodically sampling the second signal at a radar range cell on recurring radar range sweeps to obtain sampled signals and includes aggregating the magnitudes of said sampled signals for providing a reference voltage at a radar range cell during a radar range sweep.

13. A method of doppler radar detection of a received signal according to claim 9; wherein the step of providing a reference voltage includes sampling said second signal at a plurality of different radar range cells to obtain sampled signals, and includes aggregating the magnitudes of said sampled signals for providing a reference voltage at a radar range cell during a radar range sweep.

14. A method of doppler radar detection of a received signal according to claim 13, wherein the step of providing a reference voltage includes generating a timing signal that synchronizes the said sampling and said aggregating, and causes a new reference voltage to be established at each of a plurality of radar range cells during a radar range sweep.

15. A method of doppler radar detection of a received signal according to claim 9; wherein the step of providing at least one filtered signal includes providing a plurality of different filtered signals; and the step of providing a reference voltage includes the sampling of different filtered signals of said plurality of different filtered signals to provide sampled signals, and includes aggregating the magnitudes of said sampled signals for providing a reference voltage at a radar range cell during a radar range sweep.

16. A method of doppler radar detection of a received signal according to claim 15; wherein the step of providing a reference voltage includes generating a timing signal that synchronizes the said sampling and said aggregating, and causes a new reference voltage to be established at each of a plurality of radar range cells during a radar range sweep.

* * * * *